United States Patent [19]

Kajitani

[11] Patent Number: 5,842,046
[45] Date of Patent: Nov. 24, 1998

[54] DISK DRIVE SYSTEM FOR STORING A PLURALITY OF I FRAMES NON-INTERLACED WITH RESPECT TO B FRAMES BY STORING B FRAMES IN A SEPARATE CYLINDER

[75] Inventor: Kouichi Kajitani, Kawasaki, Japan

[73] Assignee: International Business Machines Corporation, Armonk, N.Y.

[21] Appl. No.: 511,006

[22] Filed: Aug. 3, 1995

[30] Foreign Application Priority Data

Aug. 23, 1994 [JP] Japan .................................. 6-198785

[51] Int. Cl.$^6$ .............................. G06F 13/10; H04N 5/76
[52] U.S. Cl. ......................... 395/894; 395/888; 395/856; 395/438
[58] Field of Search ..................... 395/888, 856, 395/438, 327, 894

[56] References Cited

U.S. PATENT DOCUMENTS

| | | | |
|---|---|---|---|
| 4,720,744 | 1/1988 | Washi et al. ............................. | 358/141 |
| 5,053,945 | 10/1991 | Whisler .................................. | 364/200 |
| 5,175,631 | 12/1992 | Juri et al. ................................ | 358/335 |
| 5,410,354 | 4/1995 | Uz .......................................... | 348/426 |
| 5,479,303 | 12/1995 | Suzuki et al. .......................... | 360/72.2 |
| 5,506,615 | 4/1996 | Awaji ...................................... | 348/7 |
| 5,563,660 | 10/1996 | Tsukagoshi ............................. | 348/384 |
| 5,583,561 | 12/1996 | Baker et al. ............................ | 348/7 |
| 5,587,806 | 12/1996 | Yamada et al. ......................... | 386/68 |

*Primary Examiner*—Thomas C. Lee
*Assistant Examiner*—Rehana Perveen
*Attorney, Agent, or Firm*—Merchant, Gould, Smith, Edell, Welter & Schmidt, P.A.

[57] ABSTRACT

A storage system for reading and storing I and B compressed video frames while improving fast video data reproduction. The system includes a storage disk, a read/write head, and a controller for positioning the I and B frames on the disk. The I frames may be stored on a first cylinder while the B frames are stored on a second cylinder. Alternately, the I frames may be stored on a plurality of cylinders. Thus, in the high-speed video reproduction mode, the controller can move the head to sequentially read I frames in the order which the I frames were stored on the plurality of cylinders. Further, the controller may move the head to sequentially read I frames stored on only one of the plurality of cylinders. In the normal video reproduction mode, a first I frame is read, followed by a B frame associated with the first I frame before proceeding to subsequent I frames. A buffer temporarily stores data read from the storage device. The buffer has a capacity equal to or greater than the capacity of two cylinders to ensure that normal video reproduction is not slower than that which is performed conventionally.

35 Claims, 5 Drawing Sheets

DISK DRIVE SYSTEM FOR STORING A PLURALITY OF I FRAMES NON-INTERLACED WITH RESPECT TO B FRAMES BY STORING B FRAMES IN A SEPARATE CYLINDER

BACKGROUND OF THE INVENTION

1. Field of the Invention.

The present invention relates in general to a data storage method and apparatus, and more particularly, to a method and apparatus for storing compressed video data on a storage disk.

2. Description of Related Art.

Among the various methods for compressing video data, a method that is generally employed is one in which a sequential series of data frames is represented by combinations of I frames and B frames. I frame data are the data for a series of frames that are compressed by eliminating data redundancies, whereas B frame data are compressed data representing the differences between the video data of one of the I frames and the video data of another frame. In the data that are compressed using this method, as is shown in FIG. 3, B frames (11 through 15 in this case) in a required count are positioned between two I frames ($I_1$ and $I_2$ in this case). By repeating such a format wherein the B frames continue to follow the I frames in the required counts, long video data may be compressed.

Distribution of compressed data to users for their employment is accomplished via CD-ROMs, floppy disks, or other movable storage media. Compressed data can also be transmitted over communication networks and decoded (expanded) and employed by users at local areas. However, the communication network transmission of compressed data is quicker and more convenient than distributing data to users on movable media, such as CD-ROMs. Thus, if the processing speed for communication networks is increased and as a consequence become more popular, users will be able to acquire, via the communication networks (regardless of whether the networks employ wire or wireless transmission), the video data they desire, such as movie films or news programs, at the times they desire.

Such a service is called video on demand. Video on demand will not only provide data transmission from distributors, such as the transmission of scheduled TV, or CATV, broadcasts at specified times, but will also have to respond to requests from users. To provide for an immediate response to a user's request, it is preferable that requested data be held in storage devices to which random access is possible. If random access to video data is possible, it will be easy to handle requests that ask for the beginning of a programmed film be skipped, for example, and that the viewing begin in the middle of the film.

A hard disk device, or a random access memory, is the apparatus that first comes to mind when the need arises for a random access storage device. Since memory having a large capacity and a low cost must be used to store video, in this respect hard disk devices hold a definite advantage over random access memory. Therefore, hard disk devices are the most desirable storage devices for use as the so-called video servers for video on demand.

When a hard disk device is employed as a video server, and when only normal video image reproduction is considered, compressed video data that are stored on a storage disk in the hard disk device are arranged as is shown in FIG. 4. To reproduce the video stream and display the resultant data on a display device, the compressed video data must be decoded (expanded).

Referring to FIG. 4, a hard disk 1 uses a head 3 both to read data stored on a storage disk 5 and to record data on the storage disk 5. For example, there may be sixteen sectors on one cylinder of the storage disk 5. In each sector, one I frame or all the B frames for that I frame may be stored (for example, five B frames if the frames $B_{11}$ through $B_{15}$ are present). Thus, frames $I_1$ through $B_8$ are recorded on cylinder 7, while frames $I_9$ through $B_{16}$ are recorded on cylinder 9. When all the data in this data arrangement are read from the cylinder 7, nothing else is required for the normal reproduction of frames $I_1$ through $B_8$. In the same manner, when all the data are read from the cylinder 9, nothing else is required for the normal reproduction of frames $I_9$ through $B_{16}$. Each read-out frame is written into and temporarily stored in a buffer (not shown), and is processed by a transmission processor (not shown). It should be noted that the order in which data is manipulated in a buffer is not affected by the order in which the data is read from the storage disk 5.

When bidirectional transmission is enabled, it is natural for a user to desire the fast forwarding of data as is performed by current video image reproduction units. Only I frames will suffice for the fast forwarding (high-speed reproduction) of data; B frames are not required. Since the B frames are interlaced between the I frames in the data arrangement that is shown in FIG. 4, the storage disk 5 must be revolved twice and the head 3 must be shifted to read all the data, from $I_1$ frame to $I_{16}$ frame, from the storage disk 5. This process requires too much time, and since it is necessary to skip the B frames on the cylinders, data reading is not very efficient.

Thus, it can be seen that there is a need for a data arrangement with which compressed video data, stored in the I frame and B frame forms, can be read fast from a storage disk during high-speed reproduction.

It can also be seen that there is a need to provide a data arrangement for a storage disk that does not substantially and adversely influence data reading speed, even during normal reproduction.

It can also be seen that there is a need to provide a video server that employs a disk storage device with which compressed data may be stored while facilitating fast data reading speeds.

SUMMARY OF THE INVENTION

To overcome the limitations in the prior art described above, and to overcome other limitations that will become apparent upon reading and understanding the present specification, the present invention discloses a disk storage device, which reads and stores compressed video data represented by a combination of I frames and B frames, whereof each of the I frames is one of a sequential series of video data frames that are compressed by eliminating redundancies in a series of video data frames, and whereof each of the B frames is a frame of compressed data that are acquired by selecting data that represent differences between video data for a frame represented by one of the I frames and video data for another frame.

The present invention solves the above-described problems by arranging I frames such that head movement is minimized during high-speed video reproduction while normal video reproduction is not adversely affected.

A system in accordance with the principles of the present invention comprises a storage disk; a head; a controller for controlling the head so as to successively store the I frames without interlacing the associated B frames therebetween so that a plurality of the I frames may be read without moving the head over B frames; and a buffer for temporarily storing data that are read from the storage disk. By using this arrangement, the reading speed is increased in a high-speed reproduction mode in which reproduction of only I frame is required.

According to one aspect of the present invention, a controller stores compressed video data on a cylinder so that when data are read by a head from a cylinder having at least in one part I frames successively recorded, the reading speed in a high-speed reproduction mode is increased.

According to a further aspect of the present invention, a storage disk storing the compressed data into locations in which at least a part of a plurality of I frames can be read sequentially in comparison with a sequence of I frames and B frames in accordance with a sequence of the sequential frame data before compressed.

Yet another aspect of the present invention is that a storage disk having successively stored I frames is read in a high-speed video reproduction mode and a buffer temporally stores the data read from the storage disk.

Another aspect of the present invention is that I frames of the compressed video data may be stored on one cylinder of the storage disk while the B frames are stored on another cylinder. A buffer is provided having a capacity equal to the capacity of at least two cylinders of the storage disk.

Still another aspect of the present invention is that a video server for routing video images to users via a communication network includes settings for high-speed video reproduction and normal video reproduction in response to requests by the user.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Figure 1:
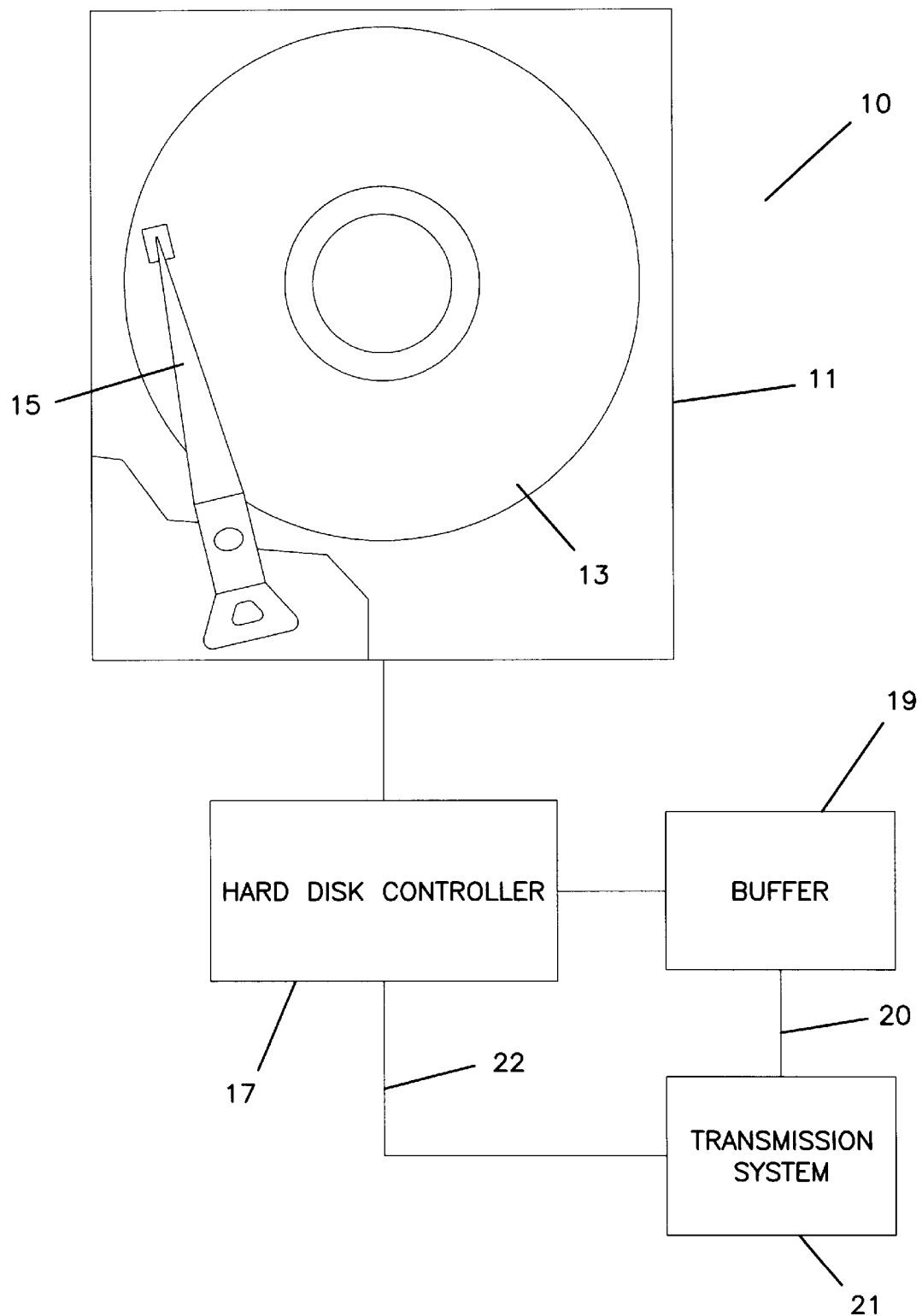
FIG. 1 is a block diagram illustrating the general structure of the present invention.

FIG. 1 illustrates an exemplary system 10 according to the present invention. A hard disk 11 includes a storage disk 13 and a head 15. Generally, a hard disk controller 17 and a buffer 19 are also included in the hard disk 11. The hard disk controller 17 is connected to the buffer 19, which is in turn connected to a transmission system 21 by a bus 20. The transmission system 21 is connected to the controller 17 by bus 22 so that it can send commands to the hard disk controller 17.

During the processing of data, the transmission system 21 forwards a command to the hard disk controller 17 to read data that are requested by a user. The hard disk controller 17 performs a control process, such as the shifting of the head 15, so as to read the requested data from the storage disk 13, and then writes the data that are read into the buffer 19. The written data are read by the transmission system 21 and processed for transmission to a user.

Although the transmission system 21 performs various other processes upon the receipt of requests from users, those processes are not related to the present invention and will not be explained.

Figure 2:
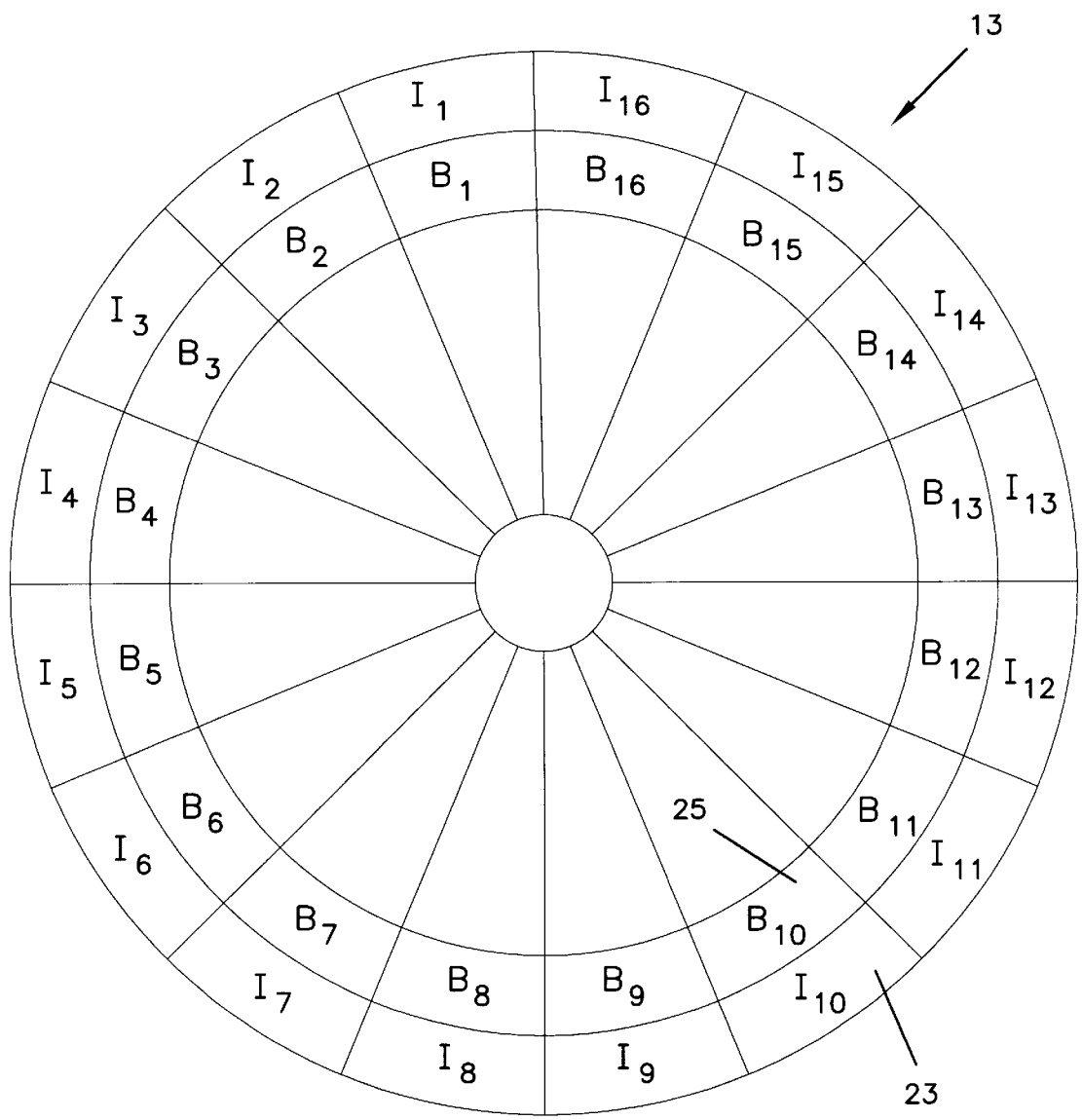
FIG. 2 is a diagram showing a data arrangement for a storage disk according to one embodiment of the present invention.
Figure 3:
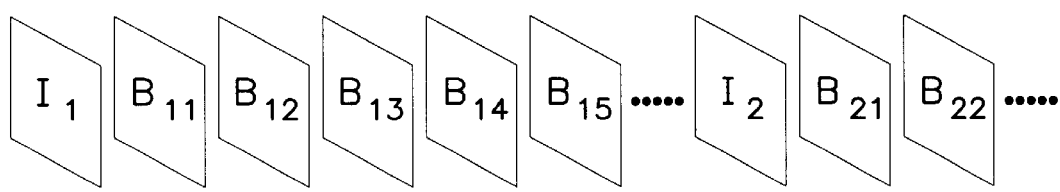
FIG. 3 is a diagram showing an example of compressed video data.
Figure 4:
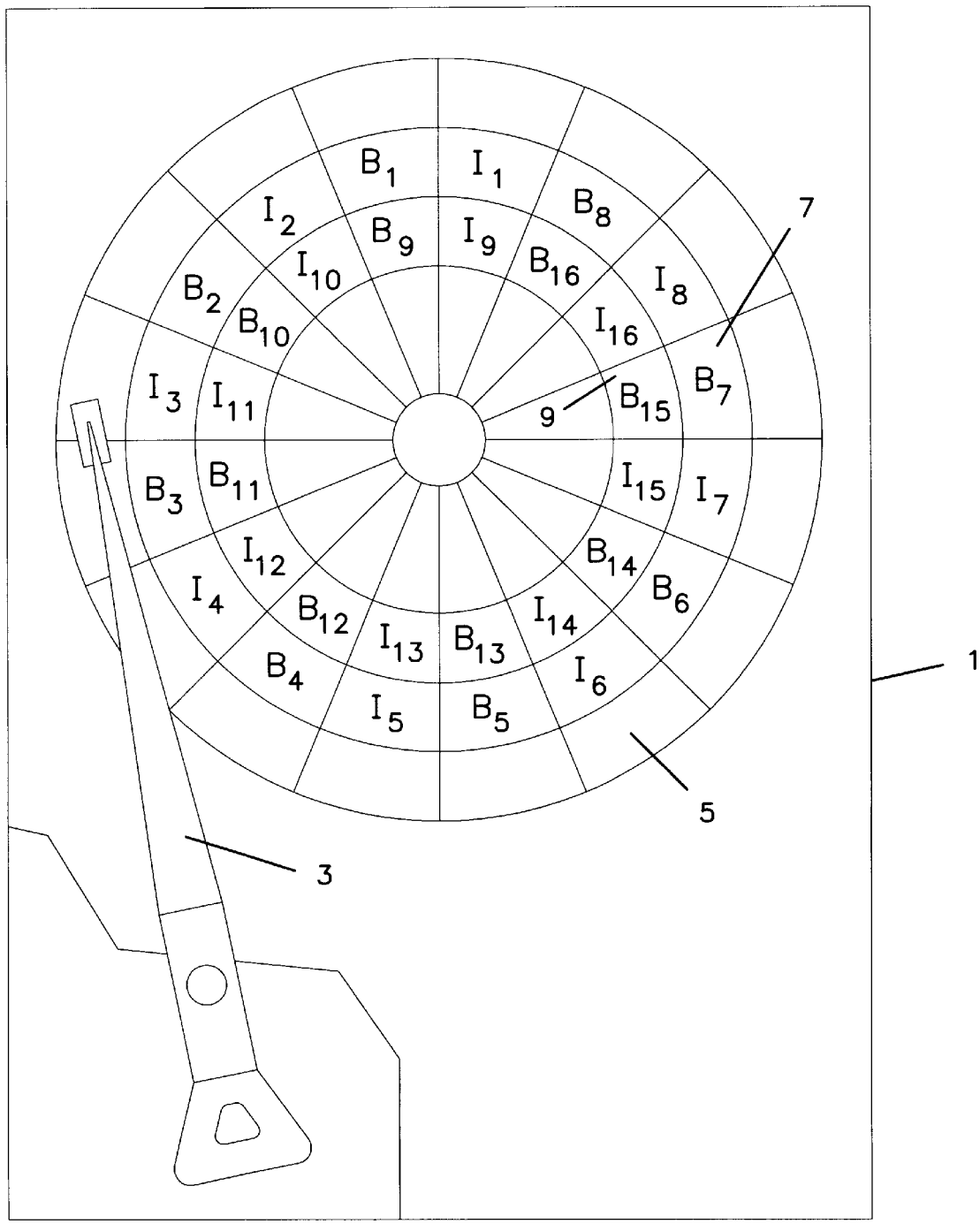
FIG. 4 is a diagram showing a conventional data arrangement for a storage disk.

According to the present invention, the data arrangement on the storage disk 13 in the system is as shown in FIG. 2. Only the storage disk 13 is depicted in FIG. 2. The same supposition as is employed in the description of the prior art is used for this storage disk. All of the B frames that are associated with the $I_1$ frame are represented as a $B_1$ frame. The I frames, $I_1$ through $I_{16}$, are successively recorded on a first cylinder 23. The B frames, $B_1$ through $B_{16}$, are recorded on a second cylinder 25. Thus, the I frames, $I_1$ through $I_{16}$, are non-interlaced with respect to B frames.

With this data arrangement, if the data on the cylinders 23 and 25 are read out in order in normal reproduction, and are thereafter written into the buffer 19, the processing speed does not differ from that of the prior art. However, since only I frames have to be read out in high-speed reproduction, the reading of data from the cylinder 23 suffices. Thus, the time required for high-speed video data reproduction is decreased to one half of that required for a conventional arrangement.

The above described processing has been discussed while disregarding the capacity of the buffer 19. In other words, the above explanation was based on the premise that the capacity of the buffer 19 was equal to or greater than the capacity of two cylinders on the storage disk 13.

When the buffer capacity is smaller than that of two cylinders, however, in normal reproduction a head must alternate between a cylinder on which I frames are stored and a cylinder on which B frames are stored. Therefore, with a buffer having a capacity that is smaller than that of two cylinders, in normal reproduction the performance efficiency of the present invention will be affected. With a buffer having a capacity that is equal to or greater than that of one cylinder, however, the present invention will perform effectively in high-speed reproduction. By taking into account the absolute reading speed (the basic ability of the hard disk) and the cost of a buffer, a satisfactory performance level for normal reproduction can be determined.

In addition, although in the above described embodiment there has been no consideration given to the number of frames that are to be stored on one cylinder, as the number of frames that are stored on one cylinder becomes greater, there will naturally be a corresponding increase in efficiency.

If one cylinder has a storage density of only several I frames, this will not only provide inadequate storage for the present invention but also for a video server. For the total capacity will be small and the data reading speed will basically be low whatever data storage method is employed.

Figure 5:
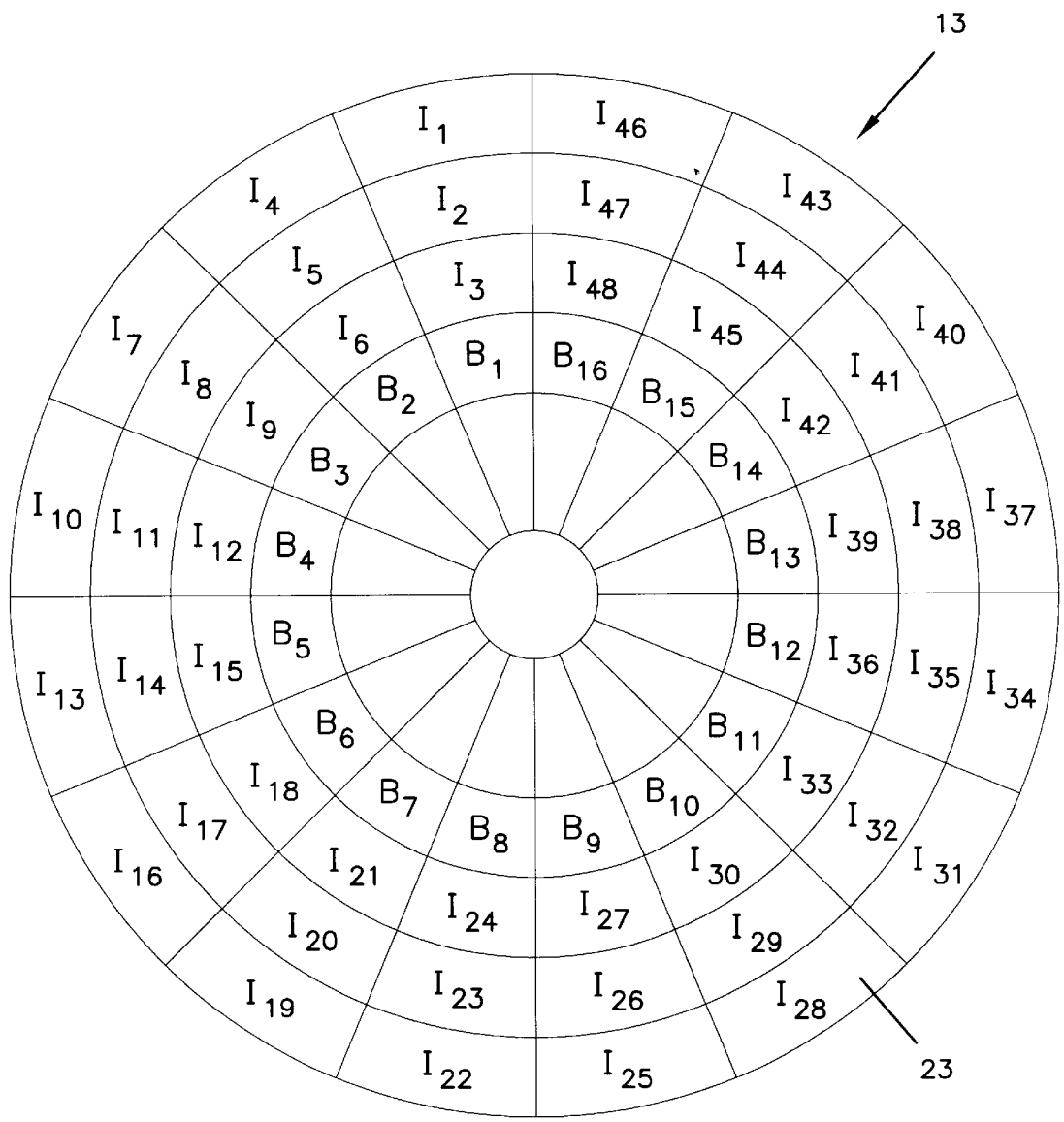
FIG. 5 is a diagram showing I frames alternately stored on three cylinders in accordance with a second embodiment of the invention.

Although in the above described embodiment, all the I frames have been read out for high-speed video reproduction, only every second I frame or every third I frame may be reproduced for higher reproduction speeds. In such a case, the I frames are successively stored on every second (or third) cylinder, while the B frames are stored on a third (or fourth) cylinder as illustrated in FIG. 5. Again, the I frames, $I_1$ through $I_{16}$, are non-interlaced with respect to the B frames. It should be noted that to prevent speed reduction in this case, for normal video reproduction more buffers will be needed, i.e., buffers for four cylinders, when I frames are stored on every second cylinder; and buffers for six cylinders, when I frames are stored on every third cylinder.

An explanation has been given for a case wherein cylinders for only I frames and cylinders for only B frames are provided. Even when different frames, or control bits other than I or B frames are stored (or mixed) in several sectors on an identical cylinder, if the stored data are groups of I frames and groups of B frames, such an arrangement may be effective in high-speed video reproduction.

For this reason, when all the data are read from one cylinder without regard for the data order and then the order is arranged in a buffer, reading control is facilitated. Therefore, if the data mixing rate is low with respect to all the sectors on one cylinder, even when all the data are read from one cylinder, unnecessary data in the buffer can be abandoned. When the rate of read-out data in the buffer that must be abandoned is increased, the effect of the present invention may not be obtained.

Although a disk storage device with only one hard disk has been described in this embodiment, the present invention is not meant to be limited to the employment of only one hard disk but is applicable for the employment of a plurality of hard disks. More specifically, the I frames can be stored on one cylinder (track) of one storage disk and the B frames that are associated with the I frame can be stored on one cylinder of another storage disk. The intent of the present invention is the storage of data on different cylinders regardless of whether the same or a different storage disk is employed (i.e., a cylinder should be distinguished from a cylinder number).

Further, it is to be understood that a video server may be implemented according to the teaching of the present invention using a plurality of hard disks. In this case, an I frame may be stored on one hard disk, while the B frames that are associated with the I frame may be stored on another hard disk. When the I frame and the B frames are stored separately, as is described in the present invention, only the hard disk for the I frames may be employed for high-speed video reproduction, and the process is thus very efficient. In this case, the I frame capacity of the hard disk buffer is sufficient if it equals the capacity of one cylinder. Since a hard disk for reading B frames also has a one-cylinder buffer capacity, the total capacity of the buffers equals the capacity of two cylinders.

Although the explanation given for the present invention has mainly applied to its use for a video server in which a hard disk is employed, the storage method can be used for other media. For example, if the reading speed of a removable medium, such as a CD-ROM, approaches that of a hard disk, a video server using such a removable medium can incorporate the present invention. Further, a CD-ROM, etc., whose reading speed is as high as that of a hard disk can be employed at home.

As described above, when compressed video data having I frame and B frame forms are reproduced at high speed, the present invention can effectively arrange the data so that it can be read from a storage disk at high speed. In addition, for normal reproduction, data arrangement on a storage disk that does not substantially affect the reading speed is possible.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A disk drive system for reading and storing compressed video data represented by a combination of I frames and B frames, wherein an I frame is a compressed video frame representing a sequential series of video frames having redundant data eliminated, and wherein a B frame is a frame of compressed data representing differences between video data for a frame represented by one of the I frames and video data for another frame, comprising:

a storage disk;

a head for reading and writing I and B frames to the disk; and a controller, coupled to the head, for moving the head relative to the disk to store a plurality of I frames that are non-interlaced with respect to the B frames, wherein the I frames are stored on a first area comprising at least one cylinder and the B frames are stored in a separate second area comprising at least one cylinder.

2. The disk drive system of claim 1 further comprising a buffer, coupled to the controller, for storing data read from the disk.

3. The disk drive system of claim 2 wherein the I frames are stored on a first cylinder on the disk and the B frames are stored on a second cylinder on the disk.

4. The disk drive system of claim 3 further comprising a mode selector for selecting between a high-speed video reproduction mode and a normal video reproduction mode.

5. The disk drive system of claim 4 wherein the controller moves the head relative to the disk to read a series of the successively stored I frames when the mode selector is set for the high-speed video reproduction mode.

6. The disk drive system of claim 5 further comprising a buffer, coupled to the controller, for storing data read from the disk and wherein the buffer has a storage capacity at least equal to two cylinders of the disk.

7. The disk drive system of claim 4 wherein the controller moves the head relative to the disk to read a first I frame and then the B frames associated with the first I frame before proceeding to a subsequent I frame when the mode selector is set for the normal video reproduction mode.

8. The disk drive system of claim 2 wherein the I frames are stored alternately on a plurality of in the first area cylinders on the disk and the B frames are stored in the separate second area on the disk.

9. The disk drive system of claim 8 further comprising a mode selector for selecting between a high-speed video reproduction mode and a normal video reproduction mode.

10. The disk drive system of claim 9 wherein the controller moves the head relative to the disk to sequentially read I frames in the order which the I frames were stored on the plurality of cylinders when the mode selector is set for the high-speed video reproduction mode.

11. The disk drive system of claim 9 wherein the controller moves the head relative to the disk to sequentially read I frames stored on one of the plurality of cylinders when the mode selector is set for the high-speed video reproduction mode.

12. The disk drive system of claim 8 further comprising a buffer having a storage capacity at least equal to two times the storage capacity of the cylinders containing the I frames.

13. The disk drive system of claim 8 wherein the controller moves the head relative to the disk to read a first I frame and then the B frames associated with the first I frame before proceeding to a subsequent I frame when the mode selector is set for the normal video reproduction mode.

14. A video server, for providing a video image to a user via a communication network, comprising:
   means for setting a high-speed video reproduction mode and a normal video reproduction mode in response to requests by a user;
   a disk storing device for reading and storing compressed video data represented by a combination of I frames and B frames, wherein an I frame is a compressed video frame representing a sequential series of video frames having redundant data eliminated, and wherein a B frames is a frame of compressed data representing differences between video data for a frame represented by one of the I frames and video data for another frame, the disk storing device comprising:
      a storage disk;
      a head for reading and writing I and B frames to the disk;
      a controller, coupled to the head, for moving the head relative to the disk to store a plurality of I frames non-interlaced with respect to B frames, wherein the I frames are stored on a first area comprising at least one cylinder and the B frames are stored in a separate second area comprising at least one cylinder;
      means for reading data from the disk storage device in response to a request from the user;
      a buffer, coupled to the controller, for storing data read from the disk; and
      means for transmitting via the communication network data read from the buffer.

15. The video server of claim 14 wherein the I frames are stored on a first cylinder on the disk and the B frames are stored on a second cylinder on the disk.

16. The video server of claim 15 wherein the controller moves the head relative to the disk to read a series of the successively stored I frames on the first cylinder when the mode selector is set for the high-speed video reproduction mode.

17. The video server of claim 16 wherein the buffer has a storage capacity at least equal to two cylinders of the disk.

18. The video server of claim 15 wherein the controller moves the head relative to the disk to read a first I frame and then the B frames associated with the first I frame before proceeding to a subsequent I frame when the mode selector is set for the normal video reproduction mode.

19. The video server of claim 14 wherein the I frames are stored alternately on a plurality of cylinders in the first area on the disk and the B frames are stored in the separate second area on the disk.

20. The video server of claim 19 wherein the controller moves the head relative to the disk to sequentially read I frames in the order which the I frames were stored on the plurality of cylinders when the mode selector is set for the high-speed video reproduction mode.

21. The video server of claim 19 wherein the controller moves the head relative to the disk to sequentially read I frames stored on one of the plurality of cylinders when the mode selector is set for the high-speed video reproduction mode.

22. The video server of claim 19 further comprising a buffer having a storage capacity at least equal to two times the storage capacity of the cylinders containing the I frames.

23. The video server of claim 19 wherein the controller moves the head relative to the disk to read a first I frame and then the B frames associated with the first I frame before proceeding to a subsequent I frame when the mode selector is set for the normal video reproduction mode.

24. a method of storing and reading compressed video data, comprising the steps of:
   creating I frames for compressed video data, the I frames representing a sequential series of video frames having redundant data eliminated;
   creating B frames for compressed video data, the B frames representing differences between video data for a frame represented by one of the I frames and video data for another frame; and
   moving a head relative to a disk to store a plurality of I frames that are non-interlaced with respect to the B frames on the disk, wherein the I frames are stored on a first area comprising at least one cylinder and the B frames are stored in a separate second area comprising at least one cylinder.

25. The method of claim 24 further comprising the step of reading data from the disk and storing the data read from the disk in a buffer.

26. The method of claim 25 wherein the step of moving the head relative to the disk to store a plurality of non-interlaced I frames further comprises the step of storing I frames on a first cylinder on the disk.

27. The method of claim 26 wherein the step of storing B frames associated with the I frame comprises the step of storing B frames on a second cylinder on the disk.

28. The method of claim 27 further comprising the step of selecting between a high-speed video reproduction mode and a normal video reproduction mode.

29. The method of claim 28 further comprising the step of sequentially reading a series of the stored non-interlaced I frames on the first cylinder when the mode selector is set for the high-speed video reproduction mode.

30. The method of claim 28 further comprising the step of reading a first I frame and then the B frames associated with the first I frame before proceeding to a subsequent I frame when the mode selector is set for the normal video reproduction mode.

31. The method of claim 25 wherein the step of moving the head relative to the disk to store a plurality of non-interlaced I frames further comprises the step of storing I frames alternately on a plurality of cylinders in the first area on the disk and storing B frames in the separate second area on the disk.

32. The method of claim 31 further comprising the step of selecting between a high-speed video reproduction mode and a normal video reproduction mode.

33. The method of claim 32 wherein the I frames are read in the order which the I frames were stored on the plurality of cylinders when the mode selector is set for the high-speed video reproduction mode.

34. The method of claim 32 wherein the I frames are read sequentially on one of the plurality of cylinders when the mode selector is set for the high-speed video reproduction mode.

35. The method of claim 32 wherein the step of moving the head relative to the disk comprises the steps of reading a first I frame and then a B frames associated with the first I frame before proceeding to a subsequently stored I frame when the mode selector is set for the normal video reproduction mode.

* * * * *